US010348969B2

(12) United States Patent
Murakami et al.

(10) Patent No.: US 10,348,969 B2
(45) Date of Patent: Jul. 9, 2019

(54) CAMERA CONTROLLER, IMAGE PROCESSING MODULE, AND SEMICONDUCTOR SYSTEM

(71) Applicant: Renesas Electronics Corporation, Koutou-ku, Tokyo (JP)

(72) Inventors: Hiroshi Murakami, Tokyo (JP); Hirohide Okuno, Tokyo (JP); Toshiya Suzuki, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 4 days.

(21) Appl. No.: 15/663,730

(22) Filed: Jul. 29, 2017

(65) Prior Publication Data

US 2018/0091739 A1 Mar. 29, 2018

(30) Foreign Application Priority Data

Sep. 28, 2016 (JP) .................................. 2016-189500

(51) Int. Cl.
*H04N 5/232* (2006.01)
*H04N 5/357* (2011.01)

(52) U.S. Cl.
CPC ..... *H04N 5/23287* (2013.01); *H04N 5/23258* (2013.01); *H04N 5/23267* (2013.01); *H04N 5/23274* (2013.01); *H04N 5/23241* (2013.01); *H04N 5/3572* (2013.01)

(58) Field of Classification Search
CPC ........... H04N 5/23287; H04N 5/23267; H04N 5/23258; H04N 5/23274; H04N 5/3572; H04N 5/23241
See application file for complete search history.

(56) References Cited

U.S. PATENT DOCUMENTS

| 7,385,632 B2 * | 6/2008 | Shinohara | .......... | H04N 5/23203 348/208.16 |
|---|---|---|---|---|
| 8,098,286 B2 | 1/2012 | Nakakuki et al. | | |
| 2006/0017817 A1 * | 1/2006 | Okubo | ............... | H04N 5/23248 348/208.99 |
| 2014/0002679 A1 * | 1/2014 | Ikeda | ................. | H04N 5/23264 348/208.5 |

(Continued)

FOREIGN PATENT DOCUMENTS

JP 2009-152793 A 7/2009

*Primary Examiner* — Nhan T Tran
(74) *Attorney, Agent, or Firm* — Shapiro, Gabor and Rosenberger, PLLC

(57) ABSTRACT

A camera module detects a camera shake in an optical axis in an optical system based on a detection result by a vibration detecting sensor. To correct a part amount of a camera shake, the module controls an actuator in a manner that a correction lens shifts in a plane vertical to the optical axis based on an amount of optical image stabilization. To correct a left amount of the camera shake, the module transmits data representing the correction left amount of the camera shake to an image processing module. The image processing module receives the data representing the correction left amount of the camera shake, and changes an effective region of picked-up image data included in frame data, based on an amount of electronic image stabilization in accordance with the correction left amount.

5 Claims, 14 Drawing Sheets

(56) References Cited

U.S. PATENT DOCUMENTS

2014/0049658 A1* 2/2014 Yamazaki .......... H04N 5/23254
                                                    348/208.11
2017/0251147 A1* 8/2017 Ikeda .................... H04N 5/2254
2018/0063443 A1* 3/2018 Ikeda .................... H04N 5/2254
2018/0213153 A1* 7/2018 Iso .......................... G03B 5/00

* cited by examiner

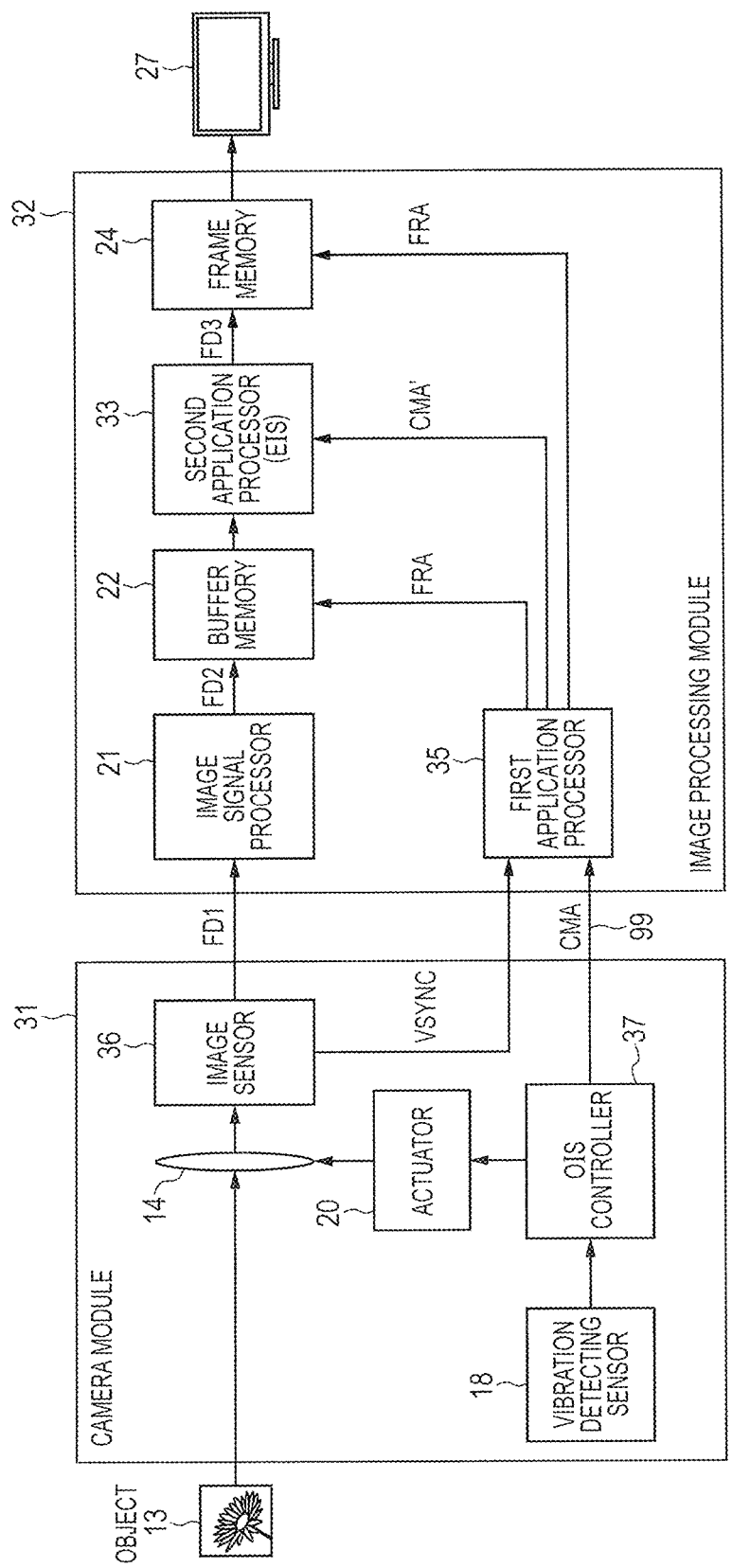

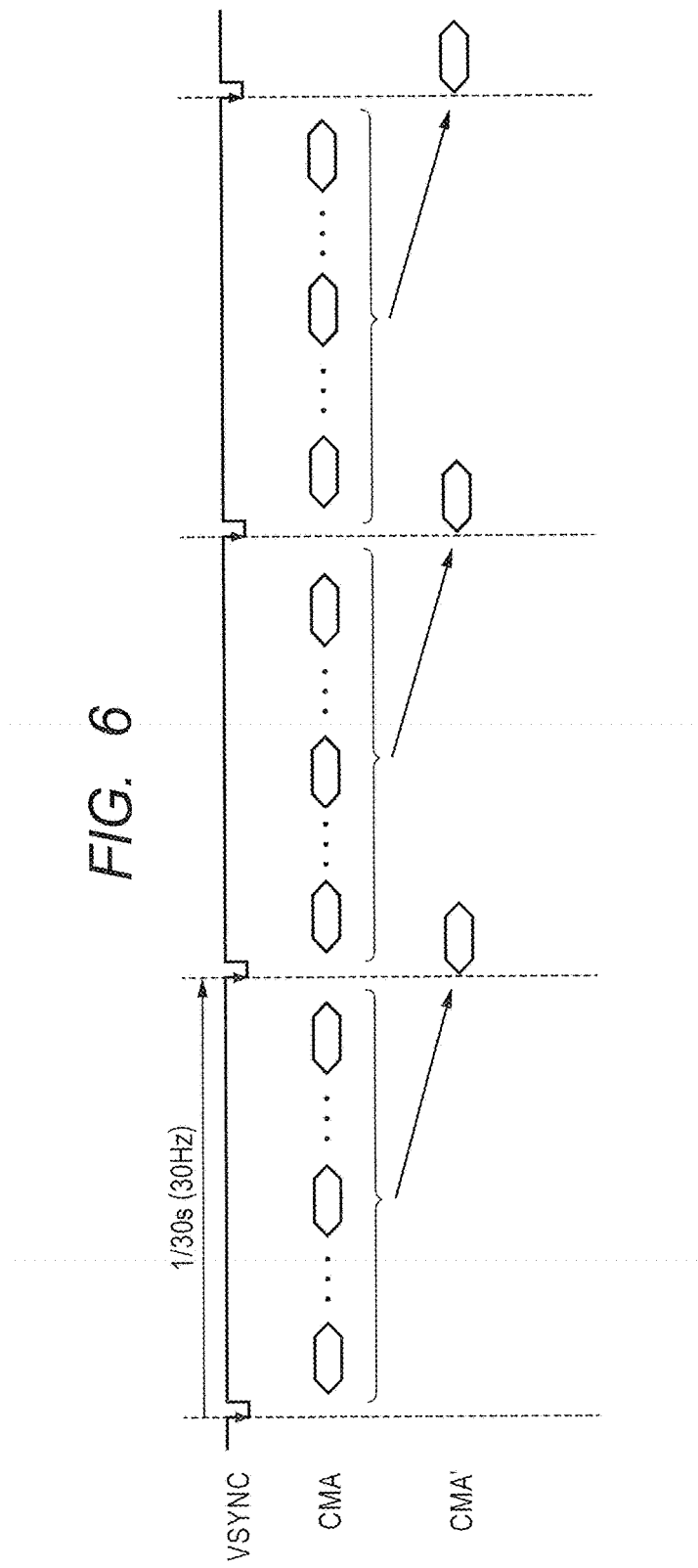

CAMERA CONTROLLER, IMAGE PROCESSING MODULE, AND SEMICONDUCTOR SYSTEM

CROSS-REFERENCE TO RELATED APPLICATIONS

The disclosure of Japanese Patent Application No. 2016-189500 filed on Sep. 28, 2016 including the specification, drawings and abstract is incorporated herein by reference in its entirety.

The present invention relates to a camera controller, an image processing module, and a semiconductor system, and relates, for example, to a camera controller which is suitable for controlling a camera with image stabilization, an image processing module, and a semiconductor system.

BACKGROUND

A camera shake correction technique is well known for video cameras and digital cameras.

For example, Japanese Unexamined Patent Application Publication No. 2009-152793 discloses a device which includes an electronic image stabilization (EIS) function and an optical image stabilization (OIS) function. In this device, an optical image stabilization unit corrects the optical axis in accordance with an output signal of a vibration detecting element. An electronic image stabilization unit adaptively changes an effective region of an image signal of an imaging region formed by imaging elements.

SUMMARY

In the device of Japanese Unexamined Patent Application Publication No. 2009-152793, in a moving image photographing mode, the electronic image stabilization is executed, and in a still image photographing mode, the optical image stabilization is executed.

The optical image stabilization is to correct a camera shake in a relatively high frequency. However, the circumferential part (end) of a picked-up image is influenced by lens distortion. A problem is that correction accuracy is deteriorated, if a great camera shake occurs, in the still image photographing mode using the optical image stabilization.

Other objects and new features will be apparent from the descriptions of the present specification and the accompanying drawings.

In an embodiment, optical image stabilization is performed for a part amount of a camera shake, and electronic image stabilization is performed for the left amount of camera shake correction.

According to the embodiment, it is possible to enhance the accuracy of the image stabilization.

BRIEF DESCRIPTION OF THE DRAWINGS

FIG. 4 is a diagram illustrating a configuration of a semiconductor system according to in a third embodiment.

FIG. 6 is a diagram illustrating timings at which a first application processor 35 receives data CMA representing a correction left vector and timings at which it receives a vertical synchronization signal VSYNC.

DETAILED DESCRIPTION

Preferred embodiments of the present invention will now be described with using the accompanying drawings.

First Embodiment

Figure 1:
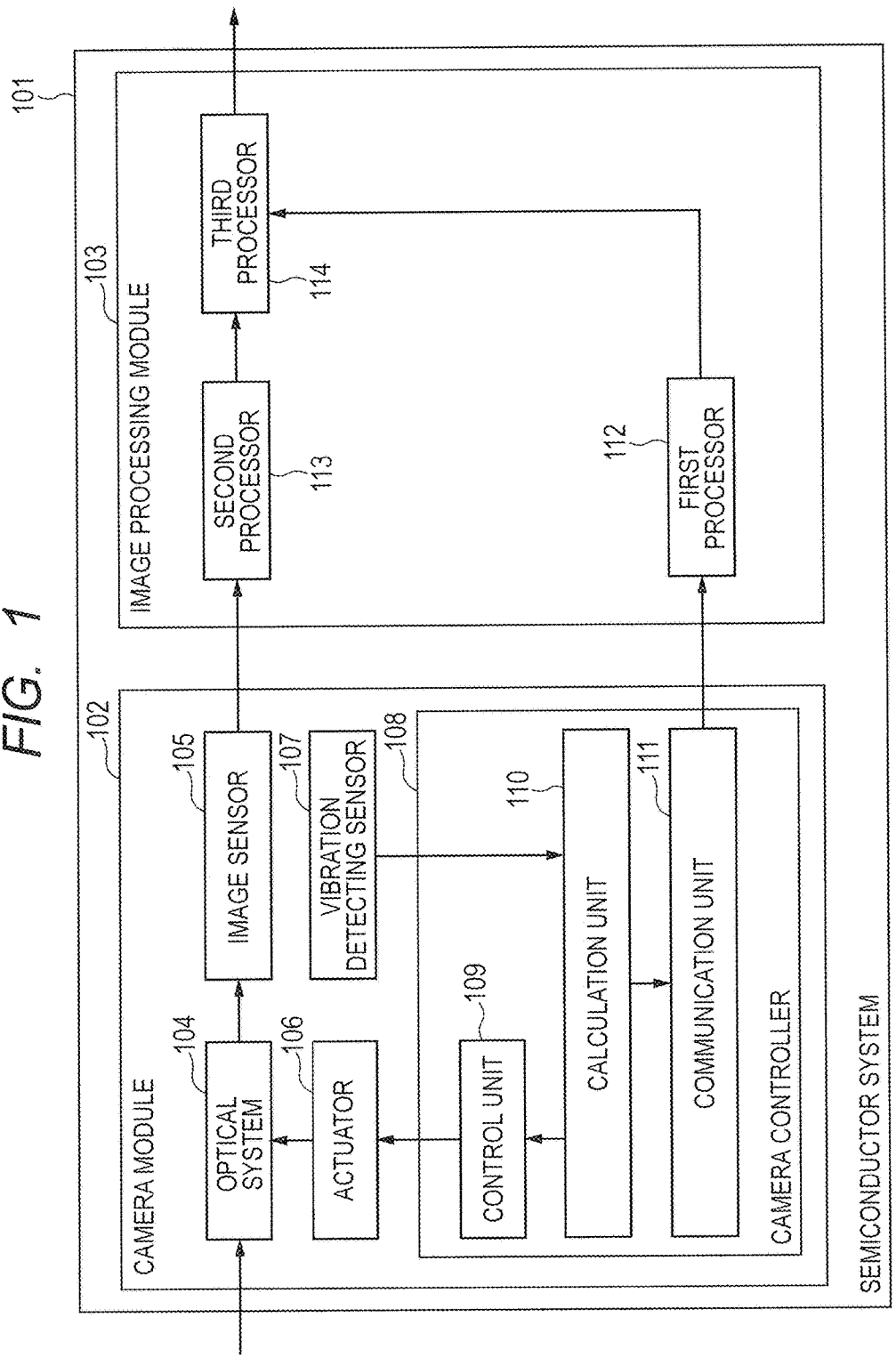
FIG. 1 is a diagram illustrating a configuration of a semiconductor system according to a first embodiment.

FIG. 1 is a diagram illustrating a configuration of a semiconductor system 100 according to a first embodiment.

This semiconductor system 100 includes a camera module 102 including an optical image stabilization function and an image processing module 103 including an electronic image stabilization function.

A camera module 101 includes an optical system 104, a vibration detecting sensor 107, an image sensor 105, an actuator 106, and a camera controller 108 controlling optical image stabilization.

The optical system 104 includes a correction lens for correcting a camera shake. Light externally enters in the optical system 104.

The vibration detecting sensor 107 detects vibration of the camera module 101.

The image sensor 105 generates a picked-up image by performing photoelectric conversion for light input through the optical system 104, and outputs frame data including the picked-up image.

The actuator 106 drives the correction lens included in the optical system 104.

The camera controller 108 includes a calculation unit 110, a control unit 109, and a communication unit 111.

The calculation unit 110 detects a camera shake in the optical axis in the optical system 104 based on a detection result by the vibration detection sensor 107. The unit 110 calculates an amount of optical image stabilization, to correct a part amount of the camera shake.

The control unit 109 controls the actuator 106 driving the correction lens in a manner that the correction lens shifts in a plane vertical to the optical axis, based on the amount of optical image stabilization.

The communication unit 111 transmits data representing the left amount of camera shake correction, to correct the left amount of the camera shake, to the image processing module 103.

The image processing module 103 includes a first processor 112, a second processor 113, and a third processor 114.

The first processor 112 receives data representing the left amount of the camera shake, as transmitted from the camera controller 108, and outputs a signal representing an amount of electronic image stabilization, in accordance with the left amount of correction.

The second processor 113 receives frame data transmitted from the image sensor 105.

The third processor 114 executes electronic image stabilization. The electronic image stabilization includes two correction methods including a first correction method for setting an effective pixel region of the picked-up image, based on a shift amount of feature points of the picked-up image, between adjacent frames, and a second correction method for setting an effective region of the picked-up image, based on a vibration detection result by the vibration detection sensor. The first correction method has a problem that a heat value increases and the power consumption increases, due to a large amount of calculation, and also a problem that it is applicable only to moving images. Further, the first correction method has a problem of deteriorating the accuracy of image stabilization, when the feature points shift not due to a camera shake. The third processor 114 can output data after execution of electronic image stabilization to, for example, a display device in the camera.

This embodiment uses the second correction method. In the following embodiments, as well, the second correction method is used as the electronic image stabilization.

The third processor 114 changes the effective region of the picked-up image included in the frame data transmitted from the second processor 113, based on an amount of electronic image stabilization transmitted from the first processor 112.

As described above, according to this embodiment, it is possible to enhance the accuracy of image stabilization, because the optical image stabilization is performed, and the electronic image stabilization is performed for the uncorrected part of the camera shake by the optical image stabilization, when a camera shake has occurred.

Particularly, in the smartphones, the mounted optical system is configured with a small number of small diameter lenses, for the light-weight and thin structure. This causes a problem that it is likely to be influenced by the lens distortion. In this embodiment, in the optical image stabilization, the correction is performed to an extent that the lens distortion is not present. The left part is corrected by the electronic image stabilization, thereby improving the accuracy of image stabilization.

In the electronic image stabilization, it is possible to correct the camera shake even for a large shake angle, with the large number of pixels of the picked-up image. However, it is not possible to correct the camera shake in a high frequency. In the moving picture photographing mode using the electronic image stabilization, a problem is that the correction accuracy is deteriorated, if the camera shake occurs in the high frequency. In this embodiment, both advantages of the optical image stabilization and the electronic image stabilization are applicable. Thus, in the still image photographing mode and in the moving image photographing mode, in the optical image stabilization, the correction is performed to an extent without the lens distortion. The left part can be corrected using the electronic image stabilization, thereby improving the accuracy of the image stabilization.

Second Embodiment

Figure 2:
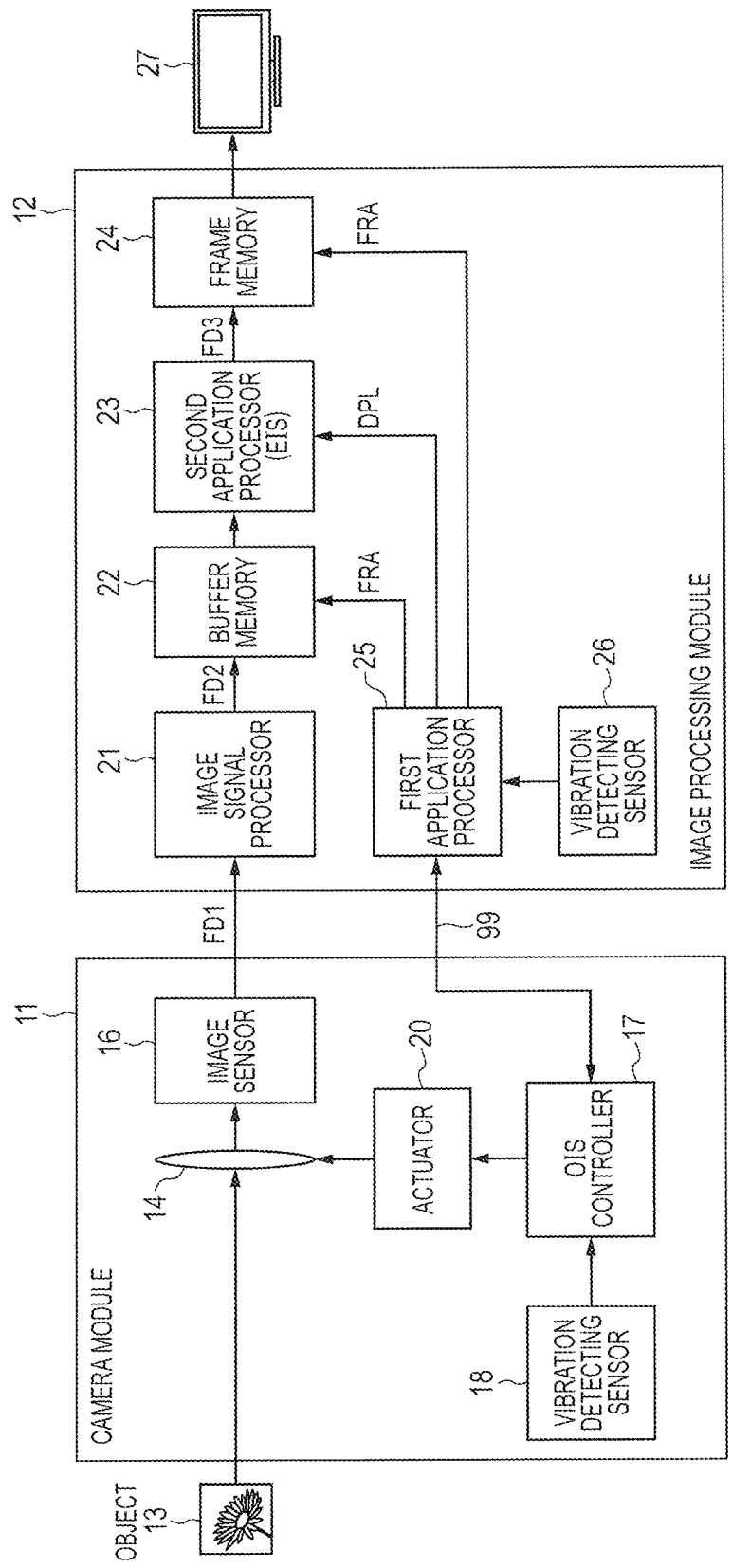
FIG. 2 is a diagram illustrating a configuration of a semiconductor system according to a second embodiment.

FIG. 2 is a diagram illustrating a configuration of a semiconductor system according to a second embodiment.

This semiconductor system includes a camera module 11, an image processing module 12, and a monitor 27.

The camera module 11 includes an optical system 14, a vibration detecting sensor 18, an actuator 20, an OIS controller 17, and an image sensor 16.

Figure 3:
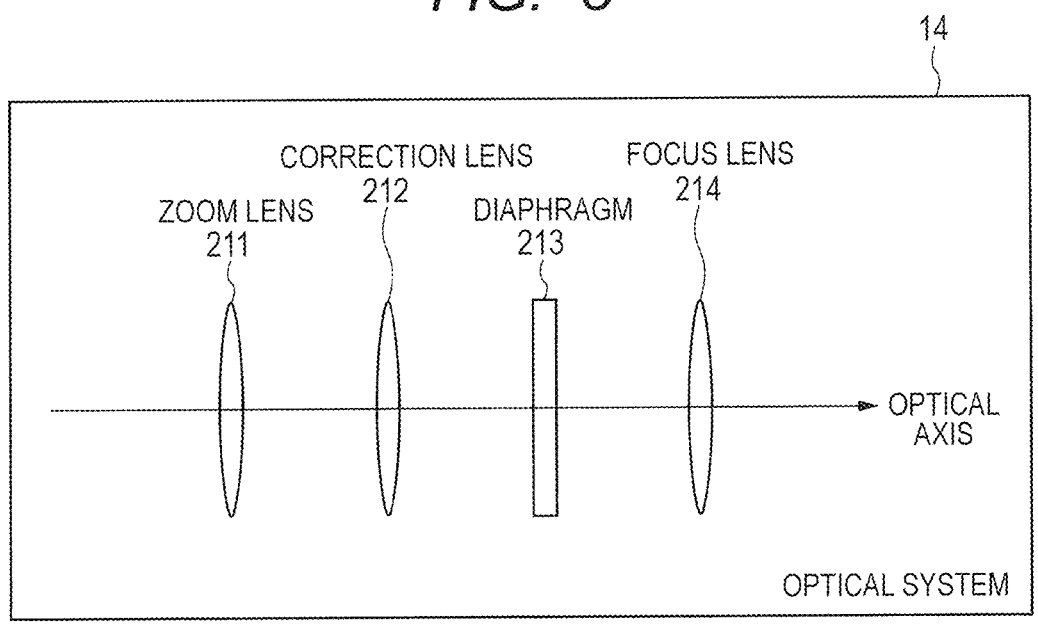
FIG. 3 is a diagram illustrating a configuration of an optical system 14.

FIG. 3 is a diagram illustrating a configuration of the optical system 14.

The optical system 14 includes a zoom lens 211, a correction lens 212, a diaphragm 213, and a focus lens 214.

The zoom lens 211 changes the magnification of an image of a subject 13. The correction lens 212 corrects a camera shake of the image of the subject 13. The correction lens 212 is moved in a direction for compensating for the camera shake of the camera module 11, thereby lowering the camera shake of the subject 13 on the image sensor 16. The diaphragm 213 adjusts the amount of light passing through the optical system 13. The focus lens 214 changes a focus state of the image of the subject 13 formed in the image sensor 16.

The vibration detecting sensor 18 detects vibration applied to the camera module 11. The vibration detecting sensor 18 is configured with a gyro sensor, detects the angular velocity in the vertical plane of the camera module 11 and the angular velocity in the horizontal plane, and outputs signals representing these angular velocities to the OIS controller 17.

The calculation unit of the OIS controller 17 calculates the rotation angle of the camera module 11, based on the signals representing the angular velocity in the vertical plane and the angular velocity in the horizontal plane, as transmitted from the vibration detecting sensor 18. The calculation unit of the OIS controller 17 calculates a camera shake vector representing a camera shake in the optical axis in the optical system 14, that is, a camera shake from the optical axis of light from the subject 13 in the light receiving surface, based on the rotation angle of the camera module 11.

The control unit of the OIS controller 17 outputs a control signal for instructing the correction lens 212 to shift in a direction of and with the magnitude of the vector in a direction opposite to that of the camera shake vector, to the actuator 20.

The actuator 20 receives a control signal from the OIS controller 17, and drives the correction lens 212 in a plane vertical to the optical axis of the optical system. The actuator 20 is configured with, for example, a magnet and a plate coil.

The image sensor 16 performs photoelectric conversion for light entering through the optical system 14, thereby generating a picked-up image. The image sensor 16 is, for example, a CMOS (Complementary Metal Oxide Semiconductor) image sensor. The CMOS image sensor includes a plurality of two-dimensionally arrayed unit pixels. Each of the unit pixels includes a photodiode, a transfer gate which transfers charges accumulated in the photodiode to a floating diffusion (FD) region, and a reset transistor which resets the charges of the floating diffusion region.

The image processing module 12 includes an image signal processor 21 which is mounted on the system main board, a buffer memory 22, a vibration detecting sensor 26, a first application processor 25, a second application processor 23, and a frame memory 24.

The camera module 11 is coupled to the image processing module 12 through an I2C (Inter-Integrated Circuit) bus 99.

The first application processor 25 in the image processing module 12 can transmit a control command to the OIS controller 17 in the camera module 11. The first application processor 25 can receive information from the OIS controller 17.

The image sensor 16 transmits frame data FD1 including a start bit stream, a frame number, a picked-up image, and an end bit stream, to the image signal processor 21. In this case, the initial value of the frame number is 0.

The image signal processor 21 performs various corrections for the brightness, color, and/or edge of the picked-up image included in the frame data FD1. Then, it outputs frame data FD2 including the picked-up image after corrected to the buffer memory 22.

The vibration detecting sensor 26 detects vibration of the image processing module 12. The vibration detecting sensor 26 is configured with a gyro sensor, detects the angular velocity in the vertical plane of the image processing module 12 and the angular velocity in the horizontal plane, and outputs signals representing these angular velocities to the first application processor 25.

The first application processor 25 calculates the rotation angle of the image processing module 12, based on the signals representing the angular velocity in the vertical plane and the angular velocity in the horizontal plane, as transmitted from the vibration detecting sensor 26. The first application processor 25 calculates a camera shake vector representing a camera shake in the optical axis in the optical system 14, that is, a camera shake in the optical axis of light from the subject 13 in the light receiving surface, based on the rotation angle of the image processing module 12. The first application processor 25 outputs a signal DPL representing the camera shake vector to the second application processor 23.

The buffer memory 22 outputs one unit of frame data FD2 to the second application processor 23, every time it receives a frame sending signal FRA.

The second application processor 23 executes electronic image stabilization. The second application processor 23 receives a signal DPL representing a camera shake vector. The second application processor 23 shifts an effective region of the picked-up image included in the frame data FD2, in a direction of and with the magnitude of the vector in a direction opposite to that of the camera shake vector.

The second application processor 23 outputs pixel data (effect image data) in the effective region of the picked-up image to the frame memory 23, as frame data FD3.

The frame memory 24 output one unit of frame data FD3, every time it receives the frame sending signal FRA.

The monitor 27 displays the frame data FD3 in the frame memory 24.

As described above, according to this embodiment, both in the moving image photographing mode and the still image photographing mode, the optical image stabilization and the electronic image stabilization can be executed, independently by the camera module 11 and the image processing module 12.

There still remains a problem that the image stabilization is excessively executed, because those stabilizations are independently executed. That is, the electronic image stabilization is further executed for an image obtained by executing the optical image stabilization in accordance with the vibration information obtained by the vibration detecting sensor 18, in accordance with the vibration information obtained by the vibration detecting sensor 26. This results in excess image stabilization.

An SPI (Serial Peripheral Interface) bus may be used, in place of the I2C bus. The same applies to other embodiments.

The camera module may include a position detecting sensor detecting the current position of the correction lens, and may perform servo control for the actuator using the current position of the correction lens which is detected by the position detecting sensor. The same applies to other embodiments.

Third Embodiment

FIG. 4 is a diagram illustrating a configuration of a semiconductor system according to a third embodiment.

This semiconductor system includes a camera module 31 and an image processing module 32.

The difference of the configuration of FIG. 4 from the configuration of FIG. 2 is that the functions of the OIS controller 37 and the image sensor 36 included in the camera module 31 of FIG. 4 and the function of the first application processor 35 included in the image processing module 32 of FIG. 4 differ from corresponding those of FIG. 2. Further difference from the corresponding that of FIG. 2 is that the image processing module 32 of FIG. 4 does not include the vibration detecting sensor.

After the frame data FD1 is formed, the image sensor 36 outputs a vertical synchronization signal VSYNC to the first application processor 35 at a timing at which the frame data FD1 is output to the image signal processor 21.

The calculation unit of the OIS controller 37 calculates a rotation angle of the camera module 31, based on signals representing an angular velocity in the vertical plane and an angular velocity in the horizontal plane, as transmitted from the vibration detecting sensor 18. The calculation unit of the OIS controller 37 calculates a camera shake vector representing a camera shake in the optical axis in the optical system 14, that is, a camera shake from the optical axis of light from the subject 13 in the light receiving surface, based on the rotation angle of the camera module 31.

The calculation unit of the OIS controller 37 calculates an optical image stabilization vector from the camera shake vector. The direction of the optical image stabilization vector is opposite to the direction of the camera shake vector. The magnitude (an amount of optical image stabilization) of the optical image stabilization vector is calculated by multiplying the magnitude of the camera shake vector (an amount of a camera shake) by a correction coefficient. The correction coefficient depends on the magnitude of the camera shake vector (amount of a camera shake).

The control unit of the OIS controller 37 outputs a control signal for instructing the correction lens 212 to shift in a direction of and with the magnitude of the optical image stabilization vector, to the actuator 20.

Figure 5A:
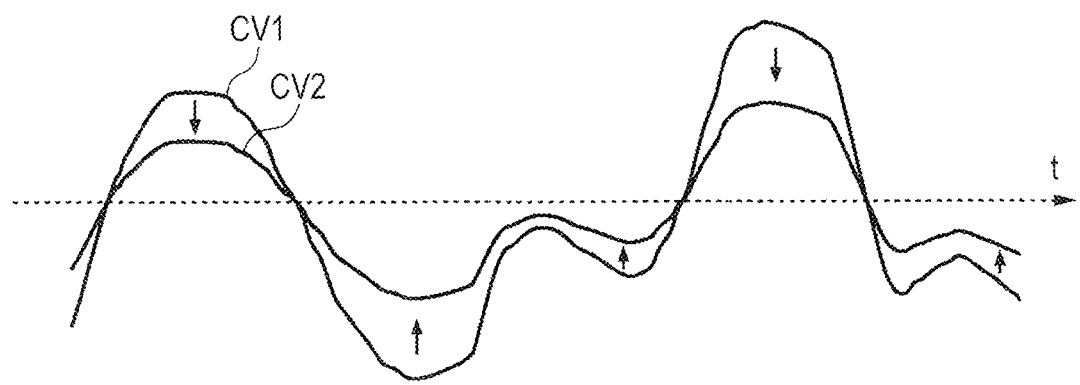
FIGS. 5A and 5B are diagrams for explaining optical image stabilization, when a correction lens 212 deviates in one axial direction of a light receiving surface, in the third embodiment.
Figure 5B:
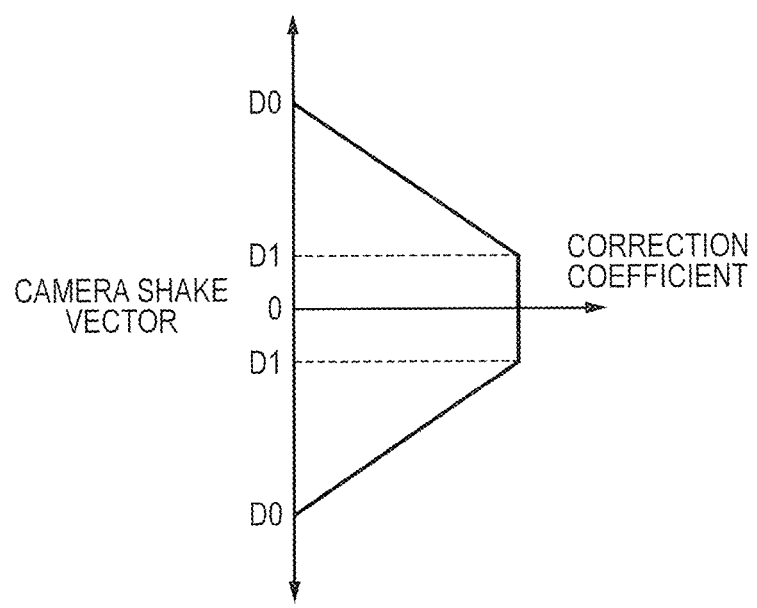

FIGS. 5A and 5B are diagrams for explaining optical image stabilization, when a correction lens 212 deviates in one axial direction of a light receiving surface, in the third embodiment.

FIG. 5A illustrates a curve CV1 representing a time change of a camera shake vector and a curve CV2 representing a time change in the position of the correction lens 212 after the optical image stabilization.

FIG. 5B illustrates correction coefficients.

When the magnitude of the camera shake vector (an amount of a camera shake) is D0, the correction coefficient is 0. When the magnitude of the camera shake vector (an amount of a camera shake) is greater than D1 and lower than D0, the correction coefficient gets greater, as the magnitude of the camera shake vector (an amount of a camera shake) gets smaller. When the magnitude of the camera shake vector (an amount of a camera shake) is equal to or smaller than D1, the correction coefficient is a constant value.

The calculation unit of the OIS controller 37 calculates a correction left vector, based on the camera shake vector and the optical image stabilization vector. The direction of the correction left vector is the same as the direction of the optical image stabilization vector (direction opposite to the direction of the camera shake vector). The magnitude of the correction left vector (a correction left amount of a camera shake) is calculated by subtracting the magnitude of the optical image stabilization vector (an amount of the optical image stabilization) from the magnitude of the camera shake vector (an amount of a camera shake). The communication unit of the OIS controller 37 outputs data CMA representing the correction left vector to the first application processor 35.

The first application processor 35 receives the data CMA representing the correction left vector and the vertical synchronization signal VSYNC.

FIG. 6 illustrates timings at which the first application processor 35 receives the data CMA representing the correction left vector and timings at which it receives the vertical synchronization signal VSYNC.

There is no synchronization between the timing of receiving the vertical synchronization signal VSYNC and the timing of receiving the data CMA. The vertical synchronization signal VSYNC is received every ⅓₀ second. The data CMA is received at a period shorter than ⅓₀ second.

When a vertical synchronization signal VSYNC is received, the first application processor 35 obtains the electronic image stabilization vector, based on the correction left vectors represented by plural elements of data CMA. The elements of data are received before the reception timing of this vertical synchronization signal and after the reception timing of the one previous vertical synchronization signal VSYNC.

For example, the average value of the correction left vectors included in the plural elements of data CMA or the correction left vector included in the most recent data CMA may be used as the electronic image stabilization vector. Alternatively, when it is intended to suppress the image stabilization, the smallest value of the correction left vectors may be used as the electronic image stabilization vector, of the correction left vectors. When it is intended to promote the image stabilization, the greatest value of the correction left vectors may be used as the electronic image stabilization vector, of the correction left vectors.

The first application processor 35 transmits a signal CMA' representing the electronic image stabilization vector to the second application processor 33.

The second application processor 33 executes the electronic image stabilization. The second application processor 33 receives the signal CMA' representing the electronic image stabilization vector. The second application processor 33 shifts the effective region of the picked-up image included in the frame data FD2, in a direction of and with the magnitude of the electronic image stabilization vector.

The second application processor 33 outputs pixel data (effective image data) in the effective region of the picked-up image to the frame memory 24, as the frame data FD3.

As described above, according to this embodiment, the OIS controller transmits data representing the correction left amount of the camera shake which could not been corrected by the optical image stabilization. The image processing module executes the electronic image stabilization, based on data representing the received correction left amount. As a result, it is possible to avoid excess image stabilization, thereby improving the accuracy of the image stabilization.

In this embodiment, the correction left vector itself (the magnitude and the direction) is transmitted as the data CMA representing the correction left vector. In this case, it is possible to reduce the amount of data flowing through the I2C bus, as compared with the case in which both of the camera shake vector and the optical image stabilization vector are transmitted.

Fourth Embodiment

Figure 7:
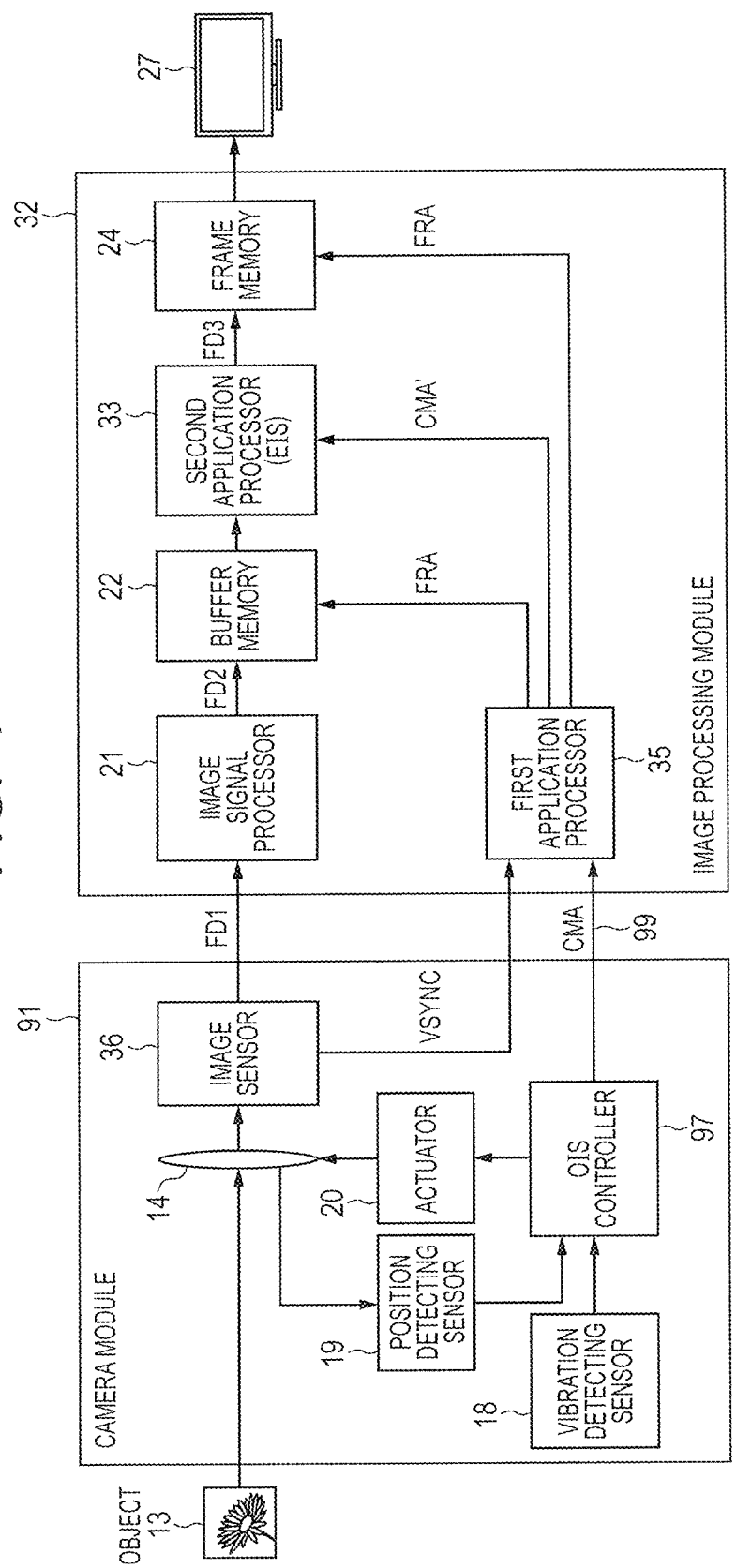
FIG. 7 is a diagram illustrating a configuration of a semiconductor system according to a fourth embodiment.

FIG. 7 is a diagram illustrating a configuration of a semiconductor system according to a fourth embodiment.

This semiconductor system includes a camera module 91 and an image processing module 32.

The difference of the configuration of FIG. 7 from the configuration of FIG. 4 is that the function of the OIS controller 97 included in the camera module 91 differs from the corresponding that of FIG. 4. Further, the camera module 91 of FIG. 7 includes a position detecting sensor 19.

The position detecting sensor 19 detects a position vector representing the position of the correction lens 212 included in the plane (light receiving surface) vertical to the optical axis of the optical system, and outputs a signal representing the position vector of the correction lens 212 to the OIS controller 97. When there is no camera shake, the position of the correction lens 212 is assumed as the original point of the position vector. The position detecting sensor 19 is configured with, for example, a magnet and a Hall element.

The calculation unit of the OIS controller 97 calculates the rotation angle of the camera module 91, based on signals representing the angular velocity in the vertical plane and the angular velocity in the horizontal plane, as transmitted from the vibration detecting sensor 18. The calculation unit of the OIS controller 97 calculates a camera shake vector representing a camera shake in the optical axis in the optical system 14, that is, a camera shake from the optical axis of light from the subject 13 in the light receiving surface.

The calculation unit of the OIS controller 97 calculates an optical image stabilization vector from the camera shake vector. The direction of the optical image stabilization vector is opposite to the direction of the camera shake vector. The magnitude of the optical image stabilization vector (an amount of optical image stabilization) is calculated by multiplying the magnitude of the camera shake vector (an amount of a camera shake) by a correction coefficient. The correction coefficient depends on the magnitude of the camera shake vector, like the third embodiment.

The control unit of the OIS controller 97 outputs a control signal for instructing the correction lens 21 to shift in a direction of and with the magnitude of the optical image stabilization vector, to the actuator 20.

The calculation unit of the OIS controller 97 calculates a correction left vector, based on the camera shake vector and the position vector of the correction lens 212 after correction (that is, after the actuator 20 has shifted). The direction of the correction left vector is the same as the direction of the optical image stabilization vector (the direction opposite to the direction of the camera shake vector). The magnitude of the correction left vector (a correction left amount of a camera shake) is calculated by subtracting the magnitude (an amount representing the position) of the position vector of the correction lens 212 from the magnitude (an amount of a camera shake) of the camera shake vector. The communication unit of the OIS controller 97 outputs data CMA representing the correction left vector to the first application processor 35.

As described above, according to this embodiment, it is possible to calculate the correction left amount, based on the position of the correction lens after the optical image stabilization. In this embodiment as well, like the third embodiment, it is possible to avoid excess image stabilization, thereby enhancing the accuracy of image stabilization.

Fifth Embodiment

Figure 8:
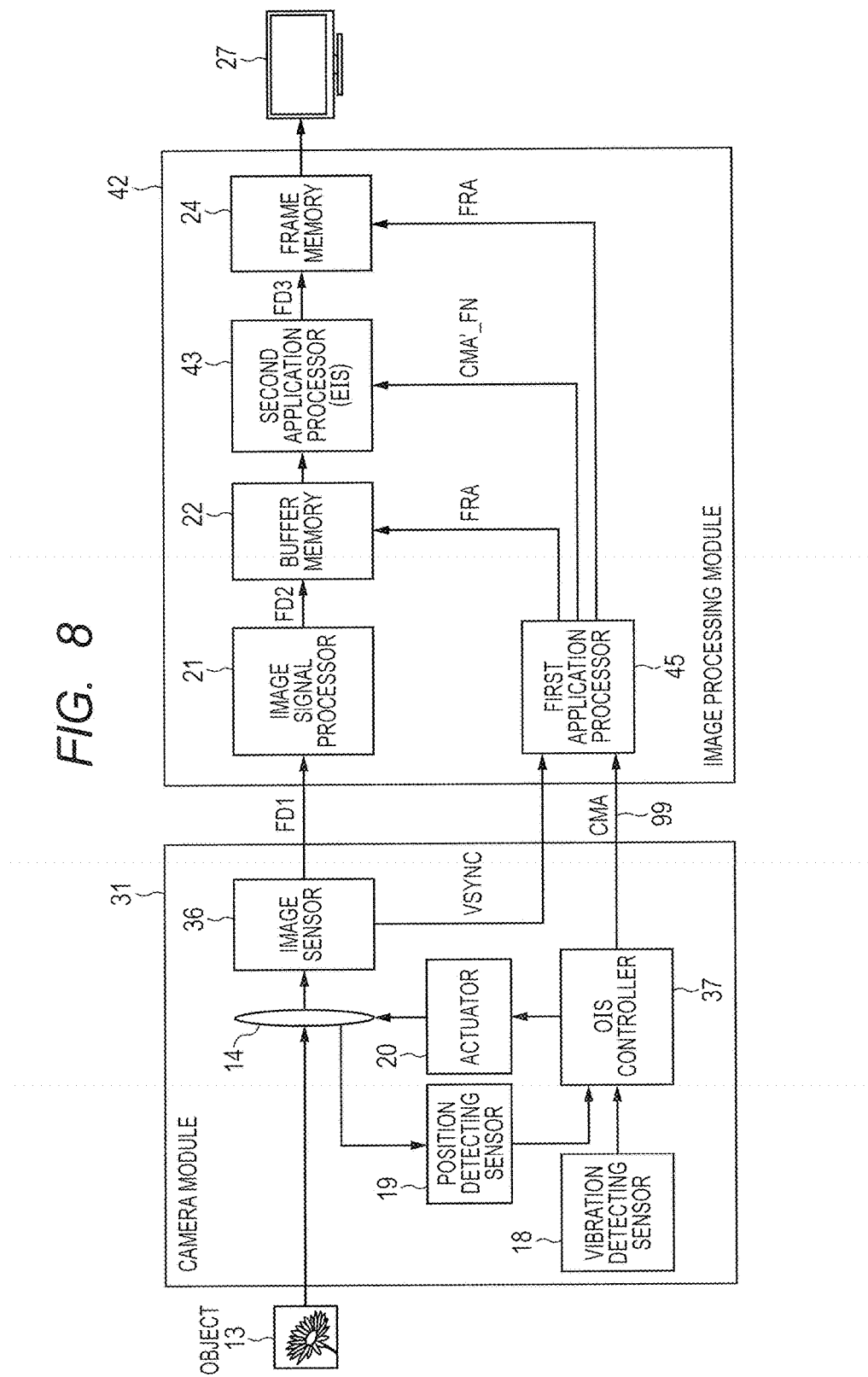
FIG. 8 is a diagram illustrating a configuration of a semiconductor system according to a fifth embodiment.

FIG. 8 is a diagram illustrating a configuration of a semiconductor system according to a fifth embodiment.

This semiconductor system includes the camera module 31 and an image processing module 42.

The difference of the configuration of FIG. 8 from the configuration of FIG. 7 is that the functions of the first application processor 45 and the second application processor 43 included in the image processing module 42 differ from corresponding those of FIG. 7.

The first application processor 45 transmits a signal CMA'_FN to the second application processor 43. This signal represents an electronic image stabilization vector with a frame number. This vector is formed of an electronic image stabilization vector with the frame number attached thereto, and obtained in the same manner as that of the third or fourth embodiment. In this case, the initial value of the frame number is 0.

The second application processor 43 executes the electronic image stabilization. The second application processor 43 successively receives the signal CMA'_FN representing the electronic image stabilization vector with the frame number attached thereto.

The second application processor 43 selects an electronic image stabilization vector with the same frame number as the frame number included in the frame data FD2 output from the buffer memory 22, of the electronic image stabilization vectors with the frame numbers, as included in the successively received signals CMA'_FN. The second application processor 43 shifts the effective region of a picked-up image included in the frame data FD2, in a direction of and with the magnitude of the selected electronic image stabilization vector.

As described above, according to this embodiment, the frame data output from the image sensor 16 and the electronic image stabilization vector output from the OIS controller can correspond to each other. Even when the frame data FD2 is thinned in the buffer memory 22 by thinned reproduction for moving images, the second application processor 23 can execute electronic image stabilization using the electronic image stabilization vector corresponding to the frame data FD2.

Sixth Embodiment

Figure 9:
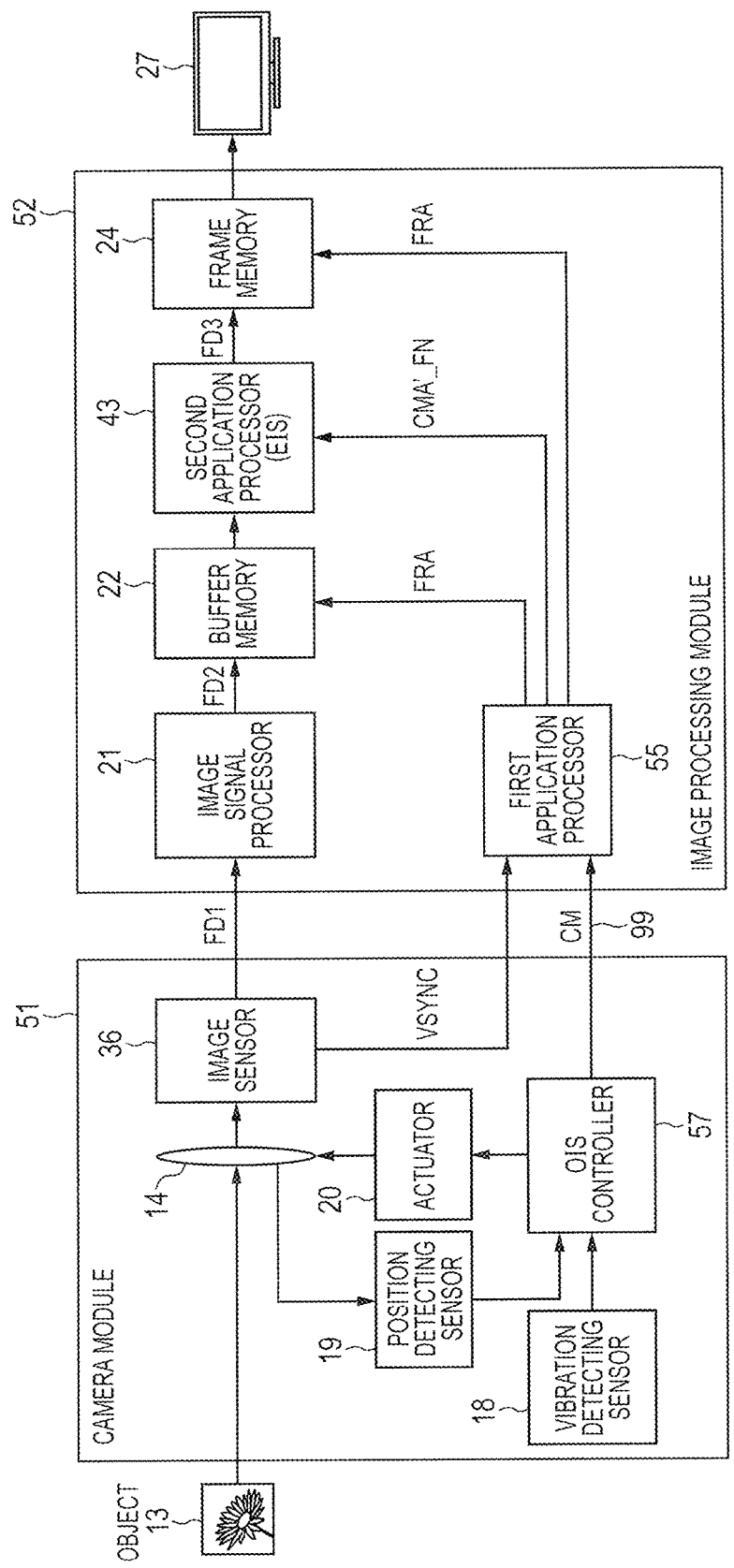
FIG. 9 is a diagram illustrating a configuration of a semiconductor system according to a sixth embodiment.

FIG. 9 is a diagram illustrating a configuration of a semiconductor system according to a sixth embodiment.

This semiconductor system includes a camera module 51 and an image processing module 52.

The difference of the configuration of FIG. 9 from the configuration of FIG. 8 is that the functions of an OIS controller 57 included in the camera module 51 of FIG. 9 and a first application processor 55 included in the image processing module 52 of FIG. 9 differ from corresponding those of FIG. 8.

The calculation unit of the OIS controller 57 calculates a rotation angle of the camera module 51, based on signals representing an angular velocity in the vertical plane and an angular velocity in the horizontal plane, as transmitted from the vibration detecting sensor 18. The calculation unit of the OIS controller 57 calculates a camera shake vector representing a camera shake in the optical axis in the optical system 14, that is, a camera shake from the optical axis of light from the subject 13 in the light receiving surface, based on the rotation angle of the camera module 51.

The calculation unit of the OIS controller 57 calculates an optical image stabilization vector from the camera shake vector. The direction of the optical image stabilization vector is opposite to the direction of the camera shake vector. The magnitude of the optical image stabilization vector is calculated by multiplying the magnitude of the camera shake vector by a correction coefficient. Like the third embodiment, the correction coefficient depends on the magnitude of the camera shake vector.

The control unit of the OIS controller 57 outputs a control signal for instructing the correction lens 212 to shift in a direction of and with the magnitude of the optical image stabilization vector, to the actuator 20. The communication unit of the OIS controller 57 outputs data CM representing the camera shake vector and a position vector of the correction lens 212 after the optical image stabilization (that is, after the actuator 20 has shifted), as data representing a correction left vector, to the first application processor 55.

The first application processor 55 receives the data CM. When the vertical synchronization signal VSYNC is received, the first application processor 55 obtains a representative camera shake vector and a representative position vector of the correction lens 212, from the camera shake vectors represented by plural elements of data CM and the position vectors of the correction lens 212 after the optical image stabilization. The elements of data are received before this reception timing and after the reception timing of the one previous vertical synchronization signal VSYNC.

For example, the camera shake vector included in the most recent data CM and the position vector of the correction lens 212 after the optical image stabilization may be set as the representative camera shake vector and the representative position vector of the correction lens 212.

The first application processor 55 obtains an electronic image stabilization vector from the representative camera shake vector and the representative position vector of the correction lens 212.

The direction of the electronic image stabilization vector is the same as the direction of the representative position vector of the correction lens 212. The magnitude of the electronic image stabilization vector can be calculated by subtracting the magnitude of the representative position vector of the correction lens 212 from the magnitude of the representative camera shake vector.

The first application processor 55 transmits a signal CMA'_FN representing an electronic image stabilization vector with a frame number to the second application processor 43. This vector is formed of an electronic image stabilization vector with the frame number attached thereto. In this case, the initial value of the frame number is 0.

The first application processor 55 may execute the electronic image stabilization, when the magnitude of the representative camera shake vector (an amount of a camera shake) is equal to or greater than a predetermined value, and may not execute the electronic image stabilization, when the magnitude of the representative camera shake vector (an amount of a camera shake) is lower than a predetermined value, even if there is a correction left amount of the camera shake. That is, the first application processor 55 may not calculate the electronic image stabilization vector, when the magnitude of the representative camera shake vector is lower than a predetermined value. By so doing, it is possible to distinguish whether a subject shake has occurred or whether a pan or a tilt has occurred, on the side of the image processing module 52. Further, it is possible to execute the electronic image stabilization, only when the subject shake has occurred.

As described above, according to this embodiment, the OIS controller transmits an amount of a camera shake as data before calculating the correction left amount and data representing the position of the correction lens, to the image processing module. Even if this data is transmitted, the same effect as that of the fifth embodiment can be obtained. It is also possible to determine whether to execute the electronic image stabilization, based on the magnitude of the representative camera shake (an amount of a camera shake).

Modification of Sixth Embodiment

In this embodiment, the OIS controller 57 outputs the data CM representing the camera shake vector and the position vector of the correction lens 212 after the optical image stabilization (after the actuator 20 has shifted), as data representing a correction left vector, to the first application processor 55. However, it is not limited to this example.

For example, the communication unit of the OIS controller 57 may output data CM representing the camera shake vector and the optical image stabilization vector as data representing a correction left vector, to the first application processor 55.

Seventh Embodiment

Figure 10:
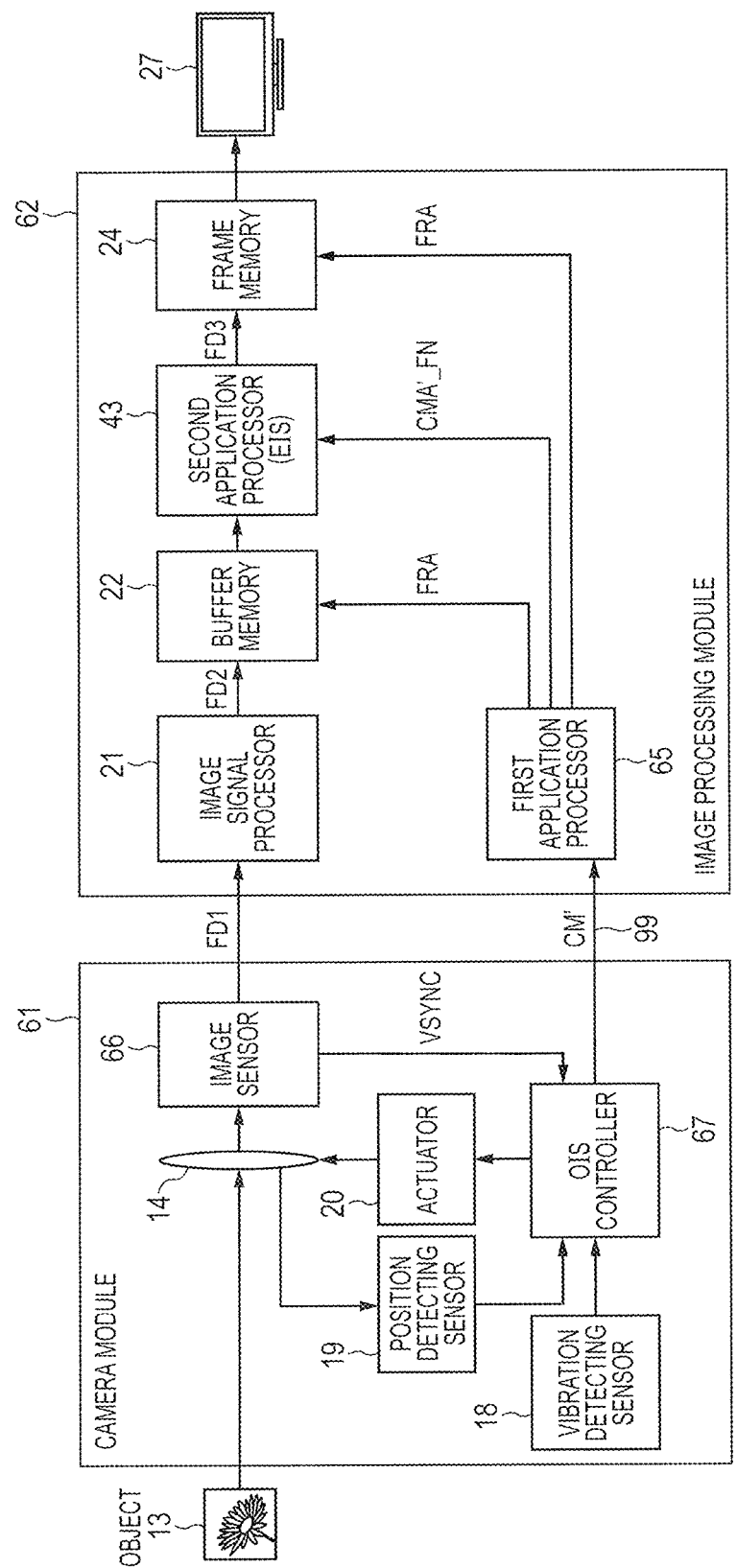
FIG. 10 is a diagram illustrating a configuration of a semiconductor system according to a seventh embodiment.

FIG. 10 is a diagram illustrating a configuration of a semiconductor system according to a seventh embodiment.

This semiconductor system includes a camera module 61 and an image processing module 62.

The difference of the configuration of FIG. 10 from the configuration of FIG. 9 is that the functions of an image sensor 66 and the OIS controller 67 included in the camera module 61 of FIG. 10 and the function of a first application processor 65 included in the image processing module 62 of FIG. 10 differ from corresponding those of FIG. 9.

After the frame data FD1 is formed, the image sensor 66 outputs the vertical synchronization signal VSYNC to the OIS controller 67 instead of the first application processor 65, at a timing of outputting the frame data FD1 to the image signal processor 21.

The calculation unit of the OIS controller 67 calculates a rotation angle of the camera module 61, based on signals representing an angular velocity in the vertical plane and an angular velocity in the horizontal plane, as transmitted from the vibration detecting sensor 18. The calculation unit of the OIS controller 67 calculates a camera shake vector representing a camera shake in an optical axis in the optical system 14, that is, a camera shake vector representing a camera shake from the optical axis of light from the subject 13 in the light receiving surface, based on the rotation angle of the camera module 61.

The calculation unit of the OIS controller 67 calculates an optical image stabilization vector from the camera shake vector. The direction of the optical image stabilization vector is opposite to the direction of the camera shake vector. The magnitude of the optical image stabilization vector is calculated by multiplying the magnitude of the camera shake vector by a correction coefficient. Like the third embodiment, the correction coefficient depends on the magnitude of the camera shake vector.

The control unit of the OIS controller 67 outputs a control signal for instructing the correction lens 212 to shift in a direction of and with the magnitude of the optical image stabilization vector, to the actuator 20.

Figure 11:
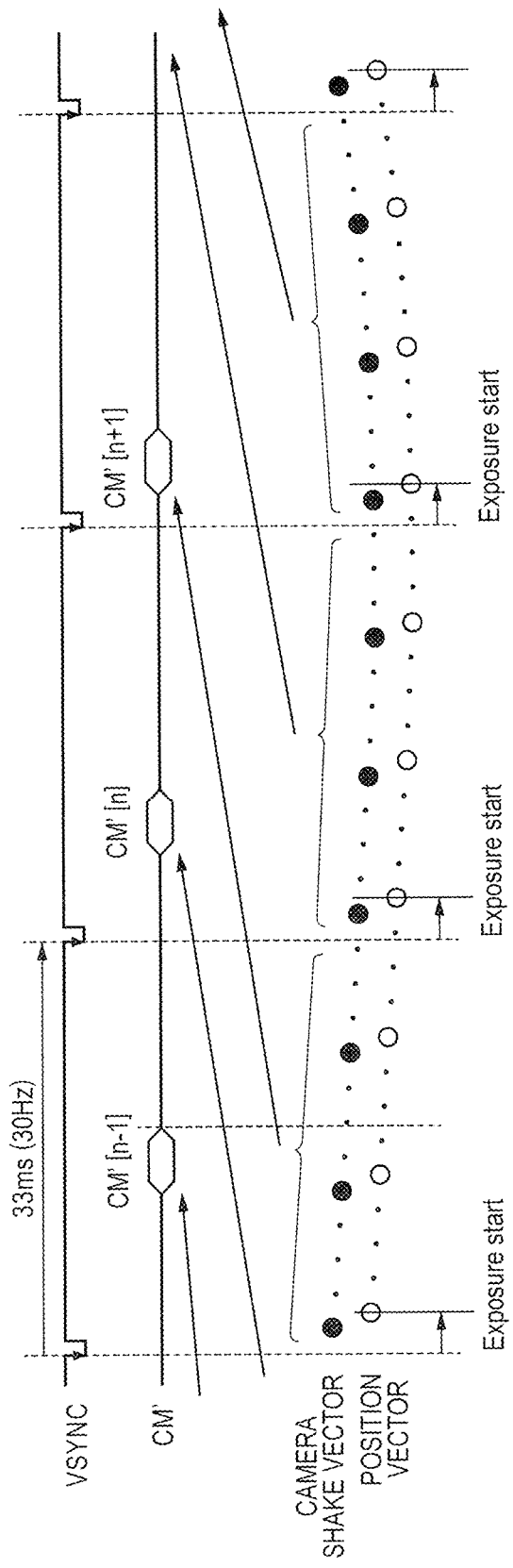
FIG. 11 is a diagram illustrating timings at which an OIS controller 67 receives a vertical synchronization signal VSYNC, timings at which it receives a camera shake vector, timings at which it receives a position vector of the correction lens 212 after optical image stabilization, and timings at which it transmits a representative camera shake vector and a representative position vector.

FIG. 11 is a diagram illustrating timings at which the OIS controller 67 receives the vertical synchronization signal VSYNC, timings at which it receives a camera shake vector, timings at which it receives a position vector of the correction lens 212 after the optical image stabilization, and timings at which it transmits a representative camera shake vector and a representative position vector.

There is no synchronization between the timing at which the OIS controller 67 receives the vertical synchronization signal VSYNC, the timing at which it receives the camera shake vector, and the timing at which it receives the position vector of the correction lens 212 after the optical image stabilization. The vertical synchronization signal VSYNC is received every 1/30 second. The camera shake vector and the position vector are received at a period shorter than 1/30 second.

Every time the vertical synchronization signal VSYNC is received, the calculation unit of the OIS controller 67 obtains the representative camera shake vector and the representative position vector of the correction lens 212, from the camera shake vectors and the position vectors of the correction lens 212 after the optical image stabilization. The vectors are obtained before this reception timing and after the timing of receiving the one previous vertical synchronization signal VSYNC.

For example, the most recent camera shake vector and the position vector of the correction lens 212 after the optical image stabilization may be set as the representative camera shake vector and the representative position vector of the correction lens 212.

The communication unit of the OIS controller 67 outputs data CM' representing the representative camera shake vector and the representative position vector of the correction lens 212, as data representing the correction left vector, to the first application processor 65.

The first application processor 65 receives the data CM'. The first application processor 67 obtains the electronic image stabilization vector from the representative camera shake vector included in the data CM' and the representative position vector of the correction lens 212. The direction of the electronic image stabilization vector is the same as the direction of the representative position vector of the correction lens 212. The magnitude of the electronic image stabilization vector is calculated by subtracting the magnitude of the representative position vector of the correction lens 212 from the magnitude of the representative camera shake vector.

The first application processor 65 transmits a signal CMA'_FN representing the electronic image stabilization vector with a frame number to the second application processor 43. This vector is formed of an electronic image stabilization vector with the frame number attached thereto. In this case, the initial value of the frame number is 0.

As described above, according to this embodiment, the OIS controller transmits the data representing the correction left amount in synchronization with the vertical synchronization signal VSYNC to the image processing module. This enables to reduce the amount of data flowing through the IC2 bus.

In this embodiment, it is possible configure a system which does not need to regenerate information necessary on the side of the first application processor, and thus which is not influenced by the performance of the first application processor.

In this embodiment, data processing can be performed in a position near to the vibration detecting sensor, in synchronization with the frame timing. Thus, it is possible to configure a system which is not influenced by the output delay of the vibration detecting sensor. Further, in this embodiment, it is also possible to generate information of a motion vector at an appropriate period. In this embodiment, the OIS controller collectively manages allocations of correction amounts for the optical image stabilization and the electronic image stabilization. Thus, it is easy to perform processing adjustment, such as sensitivity adjustment.

Modification of Seventh Embodiment

In the seventh embodiment, the communication unit of the OIS controller 67 outputs the data CM' representing the representative camera shake vector and the representative position vector of the correction lens 212 as the data representing the correction left vector, to the first application processor 65. However, it is not limited to this example.

The communication unit of the OIS controller 67 may output the data CM' representing the representative camera shake vector and a representative optical image stabilization vector as data representing the correction left vector, to the first application processor 65. The representative optical image stabilization vector may, for example, be the most recent optical image stabilization vector of the previous frame.

The communication unit of the OIS controller 67 may output data CM' representing the correction left vector which has been obtained by subtracting the representative optical image stabilization vector from the representative camera shake vector, as data representing the correction left vector, to the first application processor 65.

The communication unit of the OIS controller 67 may output data CM' representing the correction left vector which has been obtained by subtracting the representative position vector of the correction lens 212 from the representative camera shake vector, as data representing the correction left vector, to the first application processor 65.

Eighth Embodiment

Figure 12:
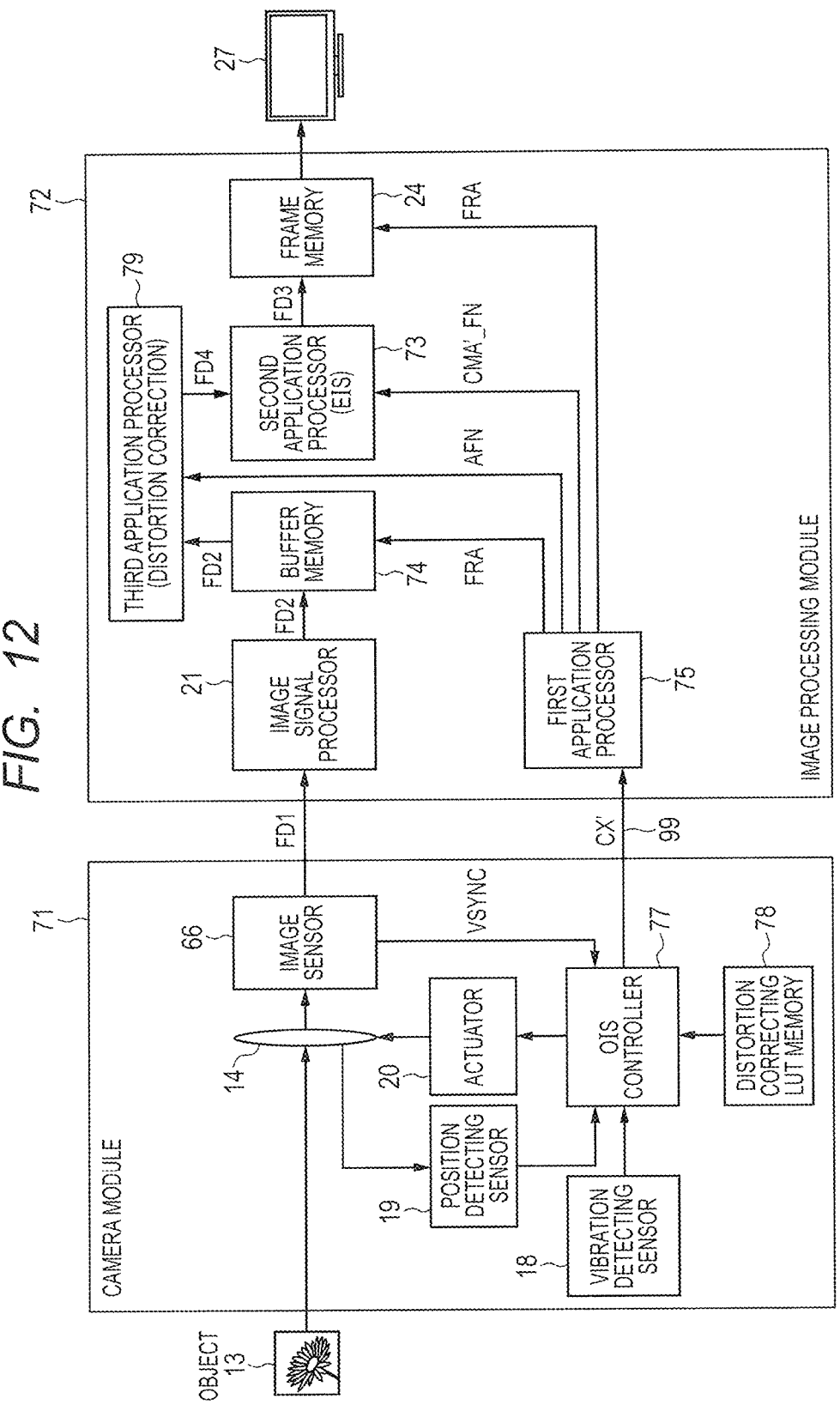
FIG. 12 is a diagram illustrating a configuration of a semiconductor system according to an eighth embodiment.

FIG. 12 is a diagram illustrating a configuration of a semiconductor system according to an eighth embodiment.

This semiconductor system includes a camera module 71 and an image processing module 72.

The difference of the configuration of FIG. 12 from the configuration of FIG. 10 is that the function of an OIS controller 77 included in the camera module 71 of FIG. 12 and the functions of a first application processor 75, a buffer memory 74, and a second application processor 73 included in the image processing module 72 of FIG. 12 differ from corresponding those of FIG. 10.

Further, the differences from those of FIG. 10 are that the camera module 71 of FIG. 12 includes a distortion correction LUT (LookUp Table) memory 78, and the image processing module 72 of FIG. 12 includes a third application processor 79.

The calculation unit of the OIS controller 77 calculates a rotation angle of the camera module 71, based on signals representing an angular velocity in the vertical plane and an angular velocity in the horizontal plane, as transmitted from the vibration detecting sensor 18. The calculation unit of the OIS controller 77 calculates a camera shake vector representing a camera shake in an optical axis in the optical system 14, that is, a camera shake from an optical axis of light from the subject 13 in the light receiving surface, based on the rotation angle of the camera module 71.

The calculation unit of the OIS controller 77 calculates an optical image correction vector from the camera shake vector. The direction of the optical image correction vector is opposite to the direction of the camera shake vector. The magnitude of the optical image stabilization vector is calculated by multiplying the magnitude of the camera shake vector by a correction coefficient. The correction coefficient depends on the magnitude of the camera shake vector.

The control unit of the OIS controller 77 outputs a control signal for instructing the correction lens 212 to shift in a direction of and with the magnitude of the optical image stabilization vector, to the actuator 20.

Figure 13A:
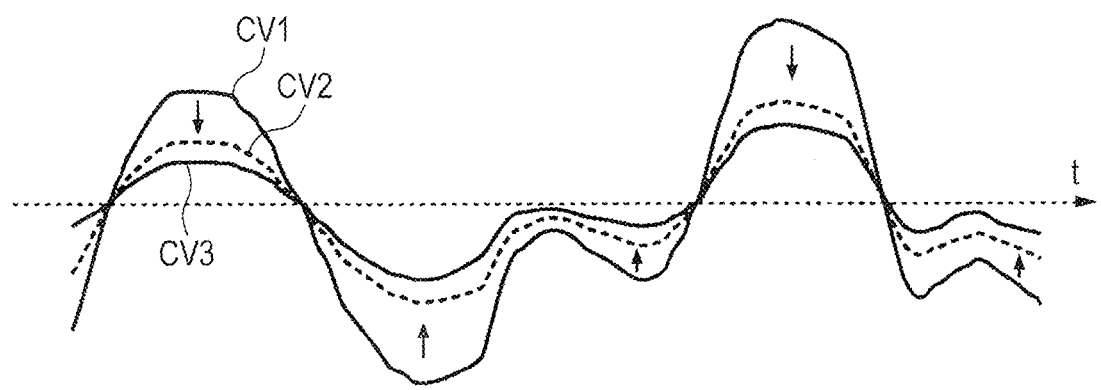
FIGS. 13A and 13B are diagrams for explaining image stabilization, when the correction lens 212 deviates in one axial direction of a light receiving surface, in the eighth embodiment.
Figure 13B:
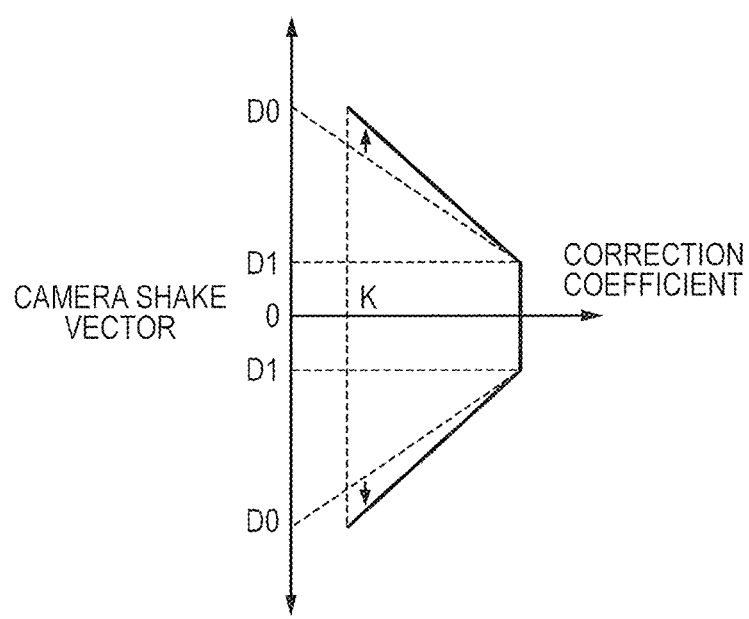

FIGS. 13A and 13B are diagrams for explaining image stabilization, when the correction lens 212 deviates in one axial direction of the light receiving surface, in the eighth embodiment.

FIG. 13A illustrates a curve CV1 representing a time change of a camera shake vector, a curve CV2 representing a time change in the position of the correction lens 212 after the correction in the third embodiment, and a curve CV3 representing a time change in the position of the correction lens 212 after the correction in the eighth embodiment, as references.

FIG. 13B illustrates the correction coefficient (a dotted line) of the third embodiment as a reference and a correction coefficient (a solid line) of the eighth embodiment.

In the eighth embodiment, when the magnitude of the camera shake vector is D0, the correction coefficient is K (>0). When the magnitude of the camera shake vector (an amount of a camera shake) is greater than D1 and lower than D0, the correction coefficient gets greater, as the magnitude of the camera shake vector (an amount of a camera shake) gets smaller. When the magnitude of the camera shake vector (an amount of a camera shake) is equal to or smaller than D1, the correction coefficient is a constant value. In the correction coefficient of this embodiment, a smaller amount of suppression is applied for the image stabilization than that for the correction coefficient of the third embodiment, and the image stabilization is executed to a certain extent at the end of the correction lens 212. Thus, distortion is generated in the picked-up image due to lens aberration.

Every time the vertical synchronization signal VSYNC is received, the calculation unit of the OIS controller 77 obtains a representative camera shake vector and a representative position vector of the correction lens 212, from the camera shake vectors and the position vectors of the correction lens 212 after the optical image stabilization. The vectors are obtained before this reception timing and after the timing of receiving the one previous vertical synchronization signal VSYNC.

The distortion correction LUT memory 78 includes a LUT storing the set corresponding relationship between the representative camera shake vector and the distortion correction data for the picked-up image. The distortion correction data may be assumed as, for example, data for affine transformation.

The calculation unit of the OIS controller 77 reads the distortion correction data corresponding to the representative camera shake vector from the distortion correction LUT memory 78.

The communication unit of the OIS controller 77 outputs distortion correction data and data CX representing the representative camera shake vector and the representative position vector of the correction lens 212 to the first application processor 75.

The first application processor 75 receives the data CX. The first application processor 67 obtains an electronic image stabilization vector from the representative camera shake vector included in the data CX and the representative position vector of the correction lens 212. The direction of the electronic image stabilization vector is the same as the direction of the representative position vector of the correction lens 212. The magnitude of the electronic image stabilization vector is calculated by subtracting the magnitude of the representative position vector (an amount representing the position) of the correction lens 212 from the magnitude of the representative camera shake vector (an amount of a camera shake).

The first application processor 75 transmits a signal CMA'_FN representing an electronic image stabilization vector with a frame number to the second application processor 43. This vector is formed of an electronic image stabilization vector with the frame number attached thereto. In this case, the initial value of the frame number is 0.

The first application processor 75 transmits distortion correction data AFN with a frame number to the third application processor 79. This data is formed of distortion correction data included in the data CX, with a frame number attached thereto.

The buffer memory 74 outputs one unit of frame data FD2 to the third application processor 79, every time the frame sending signal FRA.

The third application processor 79 selects distortion correction data with the same frame number as the frame number included in the frame data FD2 output from the buffer memory 74, of the successively received distortion correction data AFN with the frame numbers attached thereto. The third application processor 79 corrects a picked-up image included in the frame data FD2 using the distortion correction data, and transmits frame data FD4 included in the corrected picked-up image to the second application processor 73.

Figure 14A:
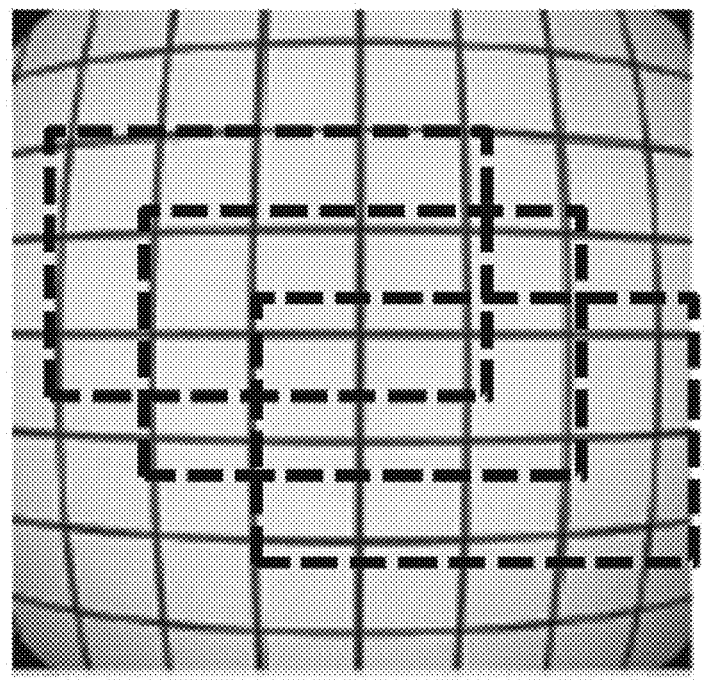
FIG. 14A is a diagram illustrating a picked-up image before distortion correction.
Figure 14B:
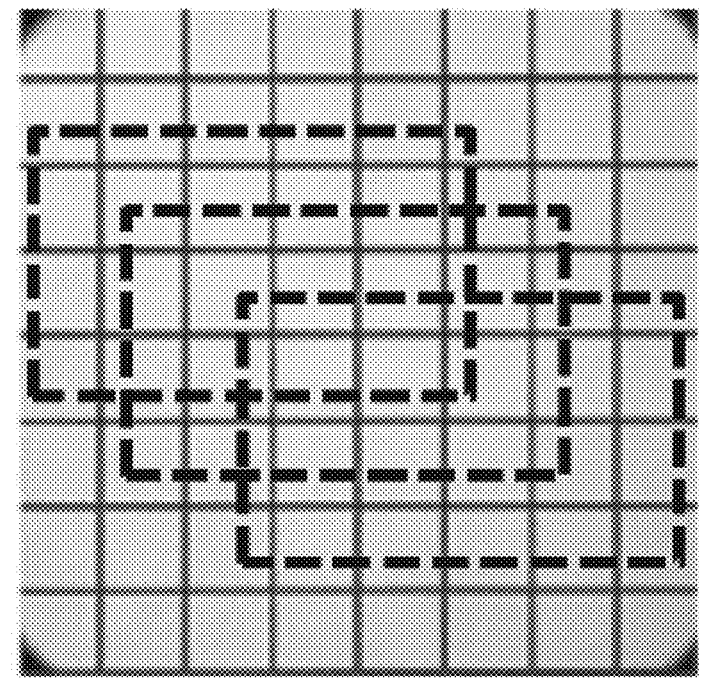
FIG. 14B is a diagram illustrating a picked-up image after distortion correction.

FIG. 14A is a diagram illustrating a picked-up image before distortion correction. FIG. 14B is a diagram illustrating a picked-up image after distortion correction. Though distortion is generated in an end part of the picked-up image generated by light input through the end part of the correction lens 212, the distortion of the picked-up image is reduced or removed by the distortion correction.

The second application processor 73 executes electronic image stabilization. The second application processor 73 selects an electronic image stabilization vector with the frame number as the frame number included in the frame data FD4, of correction left vectors with the frame numbers. These correction left vectors are included in the successively received signals CMA'_FN. The second application processor 73 shifts the effective region of the picked-up image included in the frame data FD4, in a direction of and with the magnitude of the selected electronic image stabilization vector. The second application processor 73 outputs pixel data (effective image data) in the effective region of the picked-up image to the frame memory 24, as the frame data FD3.

As described above, according to this embodiment, as a result that light is input through the end of the correction lens, even if distortion is generated in the picked-up image, distortion correction is executed in accordance with the amount of a camera shake by the image processing module. Therefore, the distortion of the image to be displayed can be removed or reduced.

Note that the distortion correction may possibly be performed only for the end part of the picked-up image, instead of for the picked-up image as a whole.

Accordingly, the descriptions have specifically been made to the inventions made by the present inventors based on the embodiments. However, the present invention is not limited to the above-described embodiments. Various changes may possibly be made without departing from the scope thereof.

What is claimed is:

1. An image processing module including an electronic image stabilization function, comprising:
   a first processor which receives data representing a correction left amount in an optical axis in an optical system, as transmitted from a camera controller, and outputs a signal representing an amount of electronic image stabilization in accordance with the correction left amount;
   a second processor which receives frame data transmitted from an image sensor; and
   a third processor which changes an effective region of a picked-up image included in the frame data, based on the amount of electronic image stabilization transmitted from the first processor,
   wherein, every time a vertical synchronization signal is received from the image sensor, the first processor obtains the amount of electronic image stabilization, based on a plurality of elements of data representing a plurality of correction left amounts of camera shakes, as received after a time at which one previous vertical synchronization signal has been received, and
   wherein the amount of electronic image stabilization is an average value, the smallest value, or the greatest value of the plurality of elements of data representing a plurality of correction left amounts of camera shakes.

2. The image processing module according to claim 1, wherein the first processor outputs a signal which includes an amount of electronic image stabilization with a frame number attached thereto, and
   wherein the third processor changes the effective region of the picked-up image, based on the amount of electronic image stabilization with a same frame number as a frame number of the frame data.

3. The image processing module according to claim 1, wherein the first processor receives distortion correction data for the picked-up image in accordance with an amount of a camera shake, together with data representing the correction left amount of the camera shake, and
   wherein the module includes a fourth processor for correcting distortion of the picked-up image using the distortion correction data.

4. The image processing module according to claim 1, wherein the first processor receives data representing an amount of a camera shake and a position of a correction lens included in the optical system after shift, as data representing the correction left amount of the camera shake, and calculates the amount of electronic image stabilization by subtracting an amount representing the position from the amount of the camera shake.

5. The image processing module according to claim 1, wherein the first processor receives data representing an amount of a camera shake and a position of a correction lens included in the optical system after shift, as data representing the correction left amount of the camera shake, and calculates the amount of electronic image stabilization by subtracting the amount representing the position from the amount of the camera shake, when the amount of the camera shake is equal to or greater than a predetermined value.

* * * * *